United States Patent
Zinin et al.

(10) Patent No.: US 9,674,655 B2
(45) Date of Patent: Jun. 6, 2017

(54) METHODS AND SYSTEMS FOR DYNAMIC DETECTION OF CONSUMER VENUE WALK-INS

(71) Applicant: Cinarra Systems Pte. Ltd., Singapore (SG)

(72) Inventors: Alexey Dmitriyevich Zinin, Santa Clara, CA (US); Dmitry Korotin, Santa Clara, CA (US)

(73) Assignee: Cinarra Systems, Singapore (SG)

(*) Notice: Subject to any disclaimer, the term of this patent is extended or adjusted under 35 U.S.C. 154(b) by 91 days.

(21) Appl. No.: 14/146,569

(22) Filed: Jan. 2, 2014

(65) Prior Publication Data

US 2014/0187270 A1 Jul. 3, 2014

Related U.S. Application Data

(60) Provisional application No. 61/748,671, filed on Jan. 3, 2013.

(51) Int. Cl.
*H04W 4/04* (2009.01)
*H04W 4/02* (2009.01)
*H04W 64/00* (2009.01)
*G06Q 30/00* (2012.01)

(52) U.S. Cl.
CPC ........... *H04W 4/021* (2013.01); *H04W 4/043* (2013.01); *G06Q 30/00* (2013.01); *H04W 64/00* (2013.01)

(58) Field of Classification Search
CPC ....... H04W 64/00; H04W 4/028; H04W 4/02; H04W 24/00; H04W 24/10; H04W 4/025; H04W 84/045; H04W 52/24–52/245; H04W 56/0095; G01C 21/206; G01C 21/00; H04B 1/1027; H04B 17/309; H04L 43/16

USPC .......................... 455/409–516, 161.1, 161.3
See application file for complete search history.

(56) References Cited

U.S. PATENT DOCUMENTS

| | | | |
|---|---|---|---|
| 5,664,948 A | 9/1997 | Dimitriadis et al. | |
| 6,992,625 B1 * | 1/2006 | Krumm ................ | G01C 21/206 342/451 |
| 7,359,716 B2 | 4/2008 | Rowitch et al. | |
| 1,105,097 A1 | 5/2011 | Tadayon et al. | |
| 2002/0095333 A1 | 7/2002 | Jokinen et al. | |

(Continued)

FOREIGN PATENT DOCUMENTS

EP 1670268 A1 6/2006
WO WO-2009036497 A1 3/2009

OTHER PUBLICATIONS

Gomez-Barroso, Jose L., et al., (2010) "Prospects of Mobile Search," Institute for Prospective Technological Studies, *JRC Scientific and Technical Reports*,Retrieved from the web on Jun. 30, 2014: http://ftp.jrc.es/EURdoc/JRC56100.pdf, 152 pages.

(Continued)

*Primary Examiner* — Allahyar Kasraian
(74) *Attorney, Agent, or Firm* — Goodwin Procter LLP (57) ABSTRACT

Methods and systems for detection of venue walk-in events by consumers in possession of wireless mobile devices. Received signal strength indication (RSSI) information is received from a plurality of wireless base stations. The RSSI information relates to mobile devices that communicate with the wireless base stations. Based on the RSSI information, it is determined whether a venue walk-in event has occurred for a particular mobile device.

14 Claims, 3 Drawing Sheets

(56) References Cited

U.S. PATENT DOCUMENTS

| | | |
|---|---|---|
| 2002/0164977 A1 | 11/2002 | Link, II et al. |
| 2003/0198346 A1 | 10/2003 | Meifu et al. |
| 2004/0209602 A1 | 10/2004 | Joyce et al. |
| 2005/0221843 A1 | 10/2005 | Friedman et al. |
| 2005/0227705 A1 | 10/2005 | Rousu et al. |
| 2005/0227711 A1 | 10/2005 | Orwant et al. |
| 2006/0058037 A1 | 3/2006 | Kenyon |
| 2007/0220034 A1* | 9/2007 | Iyer ............... G06F 17/30539 |
| 2007/0270133 A1 | 11/2007 | Hampel et al. |
| 2007/0270160 A1 | 11/2007 | Hampel et al. |
| 2007/0270161 A1 | 11/2007 | Hampel et al. |
| 2007/0270162 A1 | 11/2007 | Hampel et al. |
| 2007/0270166 A1 | 11/2007 | Hampel et al. |
| 2008/0026773 A1* | 1/2008 | Hyun ............... H04W 64/00 455/456.1 |
| 2008/0182592 A1 | 7/2008 | Cha et al. |
| 2009/0131080 A1 | 5/2009 | Nadler et al. |
| 2010/0110913 A1* | 5/2010 | Min ............... H04B 17/345 370/252 |
| 2010/0217663 A1 | 8/2010 | Ramer et al. |
| 2012/0059741 A1* | 3/2012 | Khan ............... G06Q 30/06 705/27.1 |
| 2012/0108246 A1* | 5/2012 | Monogioudis ........ H04W 16/18 455/446 |
| 2013/0231131 A1* | 9/2013 | Di Cera Colazingari .............. G01S 5/02 455/456.1 |
| 2013/0331128 A1* | 12/2013 | Qiu ............... H04W 4/021 455/456.3 |
| 2014/0067275 A1* | 3/2014 | Jing ............... G01N 15/14 702/19 |
| 2014/0171068 A1* | 6/2014 | Marti ............... G01S 1/047 455/427 |
| 2014/0285107 A1* | 9/2014 | Cavalcanti ........ H05B 33/0842 315/291 |

OTHER PUBLICATIONS

Figuera, et al., (2011) "TIme-Space Sampling and Mobile Device Calibration for WiFi Indoor Location Systems", *IEEE Transactions on Mobile Computing*, vol. 10, No. 7, pp. 913-926.

Gansemer, et al., (2010) "RSSI-based Euclidean Distance algorithm for indoor positioning adapted for the use in dynamically changing WLAN environments and multi-level building", Indoor Positioning and Indoor Navigation, *IEEE*, pp. 1-6.

International Search Report and Written Opinion for International Patent Application No. PCT/US2014/010094 dated Apr. 30, 2014, (10 pages).

Ivanov, et al., (2008) "Automatic WLAN localization for industrial automation", Factory Communication Systems, *IEEE*, pp. 93-96.

Namiot, et al., (2012) "Proximity as a service", Future Internet Communications, *IEEE*, pp. 199-205.

International Search Report and Written Opinion for International Patent Application No. PCT/US2014/010093 dated Sep. 15, 2014, (7 pages).

U.S. Appl. No. 14/146,563, Location and Time-Aware Systems and Methods for Mobile User Context Detection, filed Jan. 2, 2014.

\* cited by examiner

METHODS AND SYSTEMS FOR DYNAMIC DETECTION OF CONSUMER VENUE WALK-INS

CROSS-REFERENCE TO RELATED APPLICATION

This application claims priority to and the benefit of U.S. Provisional Patent Application No. 61/748,671, filed on Jan. 3, 2013, and entitled "Dynamic Self-Learning Method for Detecting Consumer Venue Walk-in in Local-Area Wireless Networks," the entirety of which is incorporated herein by reference.

TECHNICAL FIELD

The present disclosure relates generally to location-based services and, more specifically, to methods and systems for continuously optimizing or improving the quality of location data in wireless systems, including, but not limited to, wireless local area networks.

BACKGROUND

In recent years the number of mobile computing devices has increased dramatically, creating the need for more advanced mobile and wireless services. Mobile email, walkie-talkie services, multi-player gaming and call following are just a few examples of new applications that are emerging on mobile devices. In addition, mobile users are beginning to demand applications that not only utilize their current location but also share that location information with others. For example, parents wish to keep track of their children, supervisors need to track the location of their companies' delivery vehicles, and business travelers desire to search for nearby pharmacies to pick up prescriptions. All of these examples require the individual to know their own location or that of someone else.

To date, individuals have relied on asking for directions, calling someone to ask their whereabouts or having workers check-in from time to time with their positions. Location-based services are an emerging area of mobile applications that leverages the ability of new devices to calculate their current geographic position and report it to a mobile user or to a service. Some examples of these services include local weather, traffic updates, driving directions, child trackers, buddy finders and urban concierge services.

These new location sensitive devices rely on a variety of technologies that use the same general concept. Using radio signals coming from known reference points, these devices can mathematically calculate the mobile user's position relative to the reference points. Each of these approaches has its strengths and weaknesses based on the radio technology and the positioning algorithms they employ.

Retailers and advertisers are interested in consumer reaction to promotions and ads. More particularly, retailers and advertisers are interested in store/venue walk-ins as the key metric of success of their marketing efforts. Various venue walk-in detection methods have been utilized. These methods include, but are not limited to: (i) NFC-based check-in; (ii) barcode-based check-in; and (iii) location-based check-in. There are known limitations for (i) and (ii), such as the need for special software and hardware support on a user device and special hardware within the venue.

The location-based method is promising, provided that a high level of accuracy can be achieved even when small venues are geographically adjacent to each other. The barriers to achieve this to date include, but are not limited to: (i) the inability of GPS to provide acceptable coverage in indoor and densely populated areas due to satellite signal disruption, as well as its overall low accuracy (normally within the range of 10 meters); and (ii) the fact that 3G/4G-based networks are imprecise, and a location circle radius can be on the order of hundreds of meters or even a kilometer.

Wi-Fi has significant potential for location-based check-in. Efforts have been made in the industry to implement trilateration and radio frequency (RF) fingerprinting based methods. However, these methods have known limitations including, but not limited to: (i) in the case of trilateration, precise mathematics work well in open space or well-modeled environments where certain types and physical configurations of obstacles are presumed, but do not work well for generic cases such as a downtown city area with a multitude of stores, each with its own configuration of doors and walls; and (ii) RF fingerprinting requires special preparation such as scanning of the venue to build the reference fingerprint map, and periodic recalibration to accommodate changes in physical configuration and other radio emitters (e.g., other Wi-Fi access points, microwaves, and the like).

What is needed, then, are improved techniques that overcome the above limitations.

SUMMARY

Various embodiments of the present invention overcome the afore-described limitations by introducing a dynamic self-learning algorithm that can be used to deterministically register a certain percentage of consumer walk-ins with a very high level of accuracy for specific types of venues. In these embodiments, wireless base stations (e.g., W-Fi access points) are situated within the venues themselves, and consumers carry mobile devices that regularly communicate with the base stations.

In particular, an object of the present disclosure is to provide systems and methods for detection of venue walk-in events by consumers in possession of wireless mobile devices, where the venues are equipped with wireless base stations inside the venues themselves. As a non-limiting example, the present techniques can be performed using Wi-Fi access points and mobile handsets equipped with Wi-Fi receivers.

Another object of the present disclosure is to provide systems and methods for detection of venue walk-ins based primarily on information from the wireless network by utilizing received (or residual) signal strength indication (RSSI) readings from base stations, and without requiring major modifications of the mobile devices.

Another object of the present disclosure is to provide systems and methods to perform venue walk-in detection using a dynamic and self-learning algorithm that adjusts to specific conditions of venues of different sizes and physical configurations via collection of statistical RSSI data for each participating base station, and to periodically calculate corresponding base station profiles that can later be used to classify a particular RSSI reading as either inside the venue or outside the venue.

A further object of the present disclosure is to provide systems and methods to calculate the base station profiles by performing a series of statistical and mathematical manipulations to (a) filter out old data, (b) mitigate the misbalance between the number of indoor and outside readings, and (c) determine the inside/outside venue threshold value.

Still another object of the present disclosure is to provide systems and methods to classify individual RSSI readings as positive (inside venue) or negative (outside venue) using the pre-calculated threshold parameter that is specific to each wireless base station.

A further object of the present disclosure is to provide systems and methods to filter out non-representative individual RSSI readings that may be mistakenly classified as positive (inside the venue).

Yet another object of the present disclosure is to provide systems and methods to identify a series of positive (inside the venue) readings that indicate a probable walk-in event.

Accordingly, in one aspect, a computer-implemented method includes receiving, from a plurality of wireless base stations, RSSI information relating to mobile devices that communicate with the wireless base stations. A determination is made, based on the RSSI information, whether a venue walk-in event has occurred for a particular mobile device.

Various implementations of the method include one or more of the following features. The walk-in determination can include calculating an inside-venue RSSI threshold for each of the wireless base stations, and determining whether the venue walk-in event has occurred based on the inside-venue RSSI threshold and at least one RSSI reading relating to the particular mobile device. Updated RSSI information can be periodically received from the wireless base stations, and the inside-venue RSSI thresholds can be periodically recalculated based on the updated RSSI information. The threshold calculation can include disregarding RSSI information older than a certain age and/or disregarding RSSI information relating to mobile devices for which there are fewer than a threshold number of RSSI readings.

Further implementations of the method include one or more of the following features. The RSSI information can include: (i) a cluster of data values representing probable inside-venue RSSI readings; and (ii) a cluster of data values representing probable outside-venue RSSI readings. The threshold calculation can further include applying a corrective function to amplify the inside-venue cluster and/or de-amplify the outside-venue cluster. The inside-venue RSSI threshold can be set to a value substantially between the RSSI values in the inside-venue cluster and the RSSI values in the outside-venue cluster. The walk-in determination can include filtering out false positive venue walk-in events. An applications server can be notified of the venue walk-in event.

In another aspect, a system includes one or more computers programmed to perform operations including receiving, from a plurality of wireless base stations, RSSI information relating to mobile devices that communicate with the wireless base stations; and determining, based on the RSSI information, whether a venue walk-in event has occurred for a particular mobile device.

Various implementations of the system include one or more of the following features. The walk-in determination can include calculating an inside-venue RSSI threshold for each of the wireless base stations, and determining whether the venue walk-in event has occurred based on the inside-venue RSSI threshold and at least one RSSI reading relating to the particular mobile device. Updated RSSI information can be periodically received from the wireless base stations, and the inside-venue RSSI thresholds can be periodically recalculated based on the updated RSSI information. The threshold calculation can include disregarding RSSI information older than a certain age and/or disregarding RSSI information relating to mobile devices for which there are fewer than a threshold number of RSSI readings.

Further implementations of the system include one or more of the following features. The RSSI information can include: (i) a cluster of data values representing probable inside-venue RSSI readings; and (ii) a cluster of data values representing probable outside-venue RSSI readings. The threshold calculation can further include applying a corrective function to amplify the inside-venue cluster and/or de-amplify the outside-venue cluster. The inside-venue RSSI threshold can be set to a value substantially between the RSSI values in the inside-venue cluster and the RSSI values in the outside-venue cluster. The walk-in determination can include filtering out false positive venue walk-in events. An applications server can be notified of the venue walk-in event.

Other aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

DETAILED DESCRIPTION

Described herein are various implementations of methods and systems that detect venue walk-in events by consumers in possession of wireless mobile devices, where the mobile devices communicate with wireless base stations that are inside the venues.

Although the drawings depict components as functionally separate, such depiction is merely for illustrative purposes. It will be apparent that the components portrayed in the figures can be arbitrarily combined or divided into separate software, firmware and/or hardware components. Furthermore, it will also be apparent that such components, regardless of how they are combined or divided, can execute on the same host or multiple hosts, and multiple hosts can be connected by one or more networks.

As used herein, the term engine refers to software, firmware, hardware, or other component that is used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as input/output devices), which typically requires the execution of drivers. The drivers may or may not be considered part of the engine, but the distinction is not critical.

As used herein, the term database is used broadly to include any known or convenient means for storing data, whether centralized or distributed, relational or otherwise.

As used herein, the term mobile device can be, but is not limited to, a cell phone, such as the Apple® iPhone®, other portable electronic devices, such as the Apple® iPod Touch®, Apple® iPads®, and mobile devices based on the Google® Android® operating system, and any other portable electronic device that includes software, firmware, hardware, or a combination thereof. Typical components of the mobile device may include, but are not limited to, persistent memories like flash ROM, random access memory like SRAM, a camera, a battery, an LCD driver, a display, a cellular antenna, a speaker, a Bluetooth circuit, and WIFI circuitry, where the persistent memory may contain programs, applications, and/or an operating system for the mobile device.

It should also be noted that implementations of the present techniques can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

Figure 1:
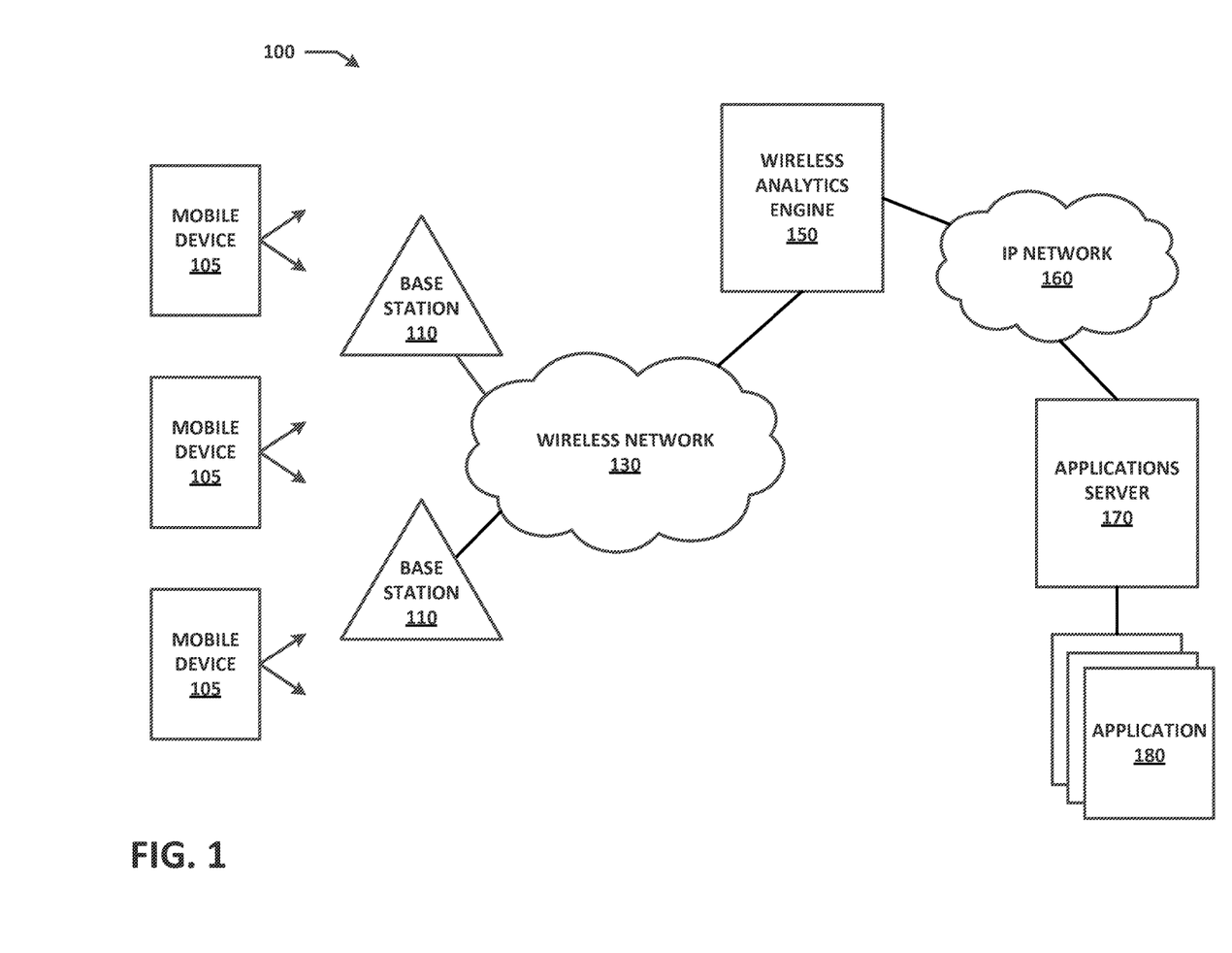
FIG. 1 is a high-level architecture of an example system according to an implementation of the invention.

As illustrated in FIG. 1, in one implementation, a system 100 includes wireless indoor (i.e., inside a venue) base stations 110, mobile user devices 105 that support the wireless technology used by the base stations 110 (e.g., Wi-Fi), a wireless Analytics Engine 150, and one or more Applications Servers 170 interested in user venue "walk-in" event notifications, which can be processed and relayed to one or more applications 180. The Analytics Engine 150 can receive information from the base stations 110 over a wireless network 130, and the Analytics Engine 150 can communicate with the Applications Server 170 over the same or a different network (e.g., IP network 160). It should be noted that the elements presented here are functional, and the actual implementation may place the associated functionality in different physical modules. As a non-limiting example, part or all of the Analytics Engine 150 functionality may be implemented within the base stations 110. As another non-limiting example, part of the Analytics Engine 150 functionality may be implemented inside a product deployed in the mobile carrier network environment, while non-real-time functions are placed in a centralized Internet server farm (i.e., a cloud).

In one implementation, the system 100 utilizes a Wi-Fi network as the wireless network 130, the base stations 110 are Wi-Fi access points and the mobile user devices 105 are Wi-Fi-enabled smartphones. In operation, mobile user devices 105 can periodically broadcast beacon or probe messages (e.g., Wi-Fi probe frames), perform attachments to base stations 110, and transmit data to the base stations 110.

Each base station 110 that receives a broadcast or unicast message from a mobile user device 105 performs a measurement of the received (or residual) signal strength indication (RSSI). The Analytics Engine 150 then periodically collects RSSI information about the mobile devices 105, as identified by their MAC addresses, via the base stations 110. As an alternative, the base stations 110 can send RSSI updates to the Analytics Engine 150 dynamically (e.g., every 10 seconds, every 30 seconds, every 3 minutes, and so on).

The Wi-Fi Analytics Engine 150 can perform calculations to detect user "walk-ins" for specific venues (e.g., when a user enters a defined space, such as an indoor store, restaurant, mall, and so on). The Wi-Fi Analytics Engine 150 informs interested Applications Servers 170 about the venue walk-in events, and the Applications Servers 170 can communicate with interested applications 180. For example, upon receiving a notification that a walk-in event has occurred for a particular mobile device, the Applications Server 170 can notify an application 180 on the mobile device to take an action (e.g., display a welcome message, provide a coupon, etc.).

In one implementation, a walk-in detection algorithm is employed to determine when a venue walk-in has occurred. Each RSSI value captured by the base stations 110 represents the strength of the radio signal from a mobile user's device 105 to the base station 110 in a numerical form (e.g., "0 db" indicating strongest, and "−100 db" indicating weakest). By its nature, the RSSI value indirectly reflects the distance and potential obstacles between the mobile device 105 and the measuring base station 110.

A static threshold cannot be set to denote what constitutes the "inside" of a venue for a number of reasons, including: (i) the mobile device signal strength fluctuates depending on radio environment and device conditions (e.g., battery levels, activity of other devices, etc.); and (ii) different venues have varying physical configurations of walls, windows, doors, and the like. To resolve this limitation, the system 100 calculates the inside-venue RSSI threshold value dynamically for each base station and periodically updates it to reflect potential changes in the radio and physical environment.

Figure 2:
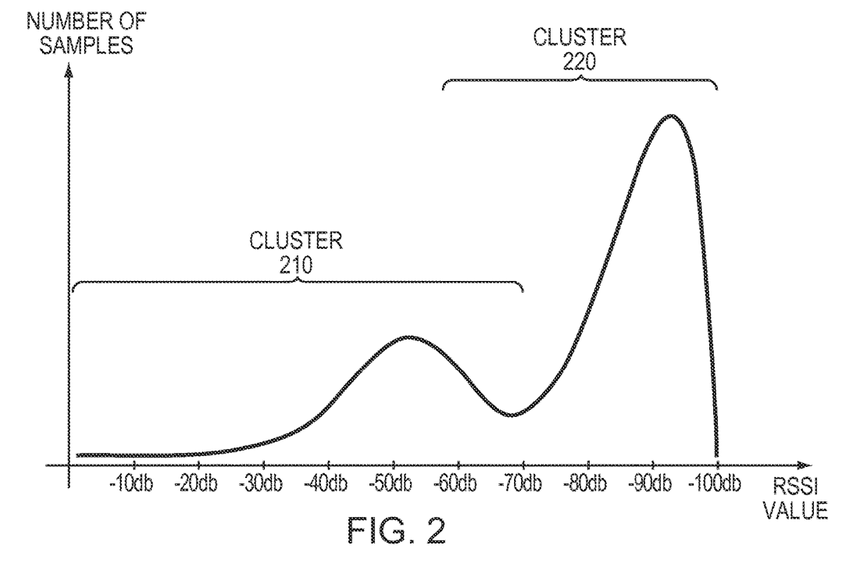
FIG. 2 is a line graph of example RSSI data according to an implementation of the invention.

In one implementation, the system 100 continuously collects a statistical set of RSSI samples for one or more access points. The statistical distribution of RSSI readings consists of samples provided by consumers having mobile devices that are both inside and outside a particular venue (of which the system 100 has no direct knowledge). Contrary to what is expected, the RSSI samples are not uniformly distributed throughout the domain of possible RSSI values, but, provided the statistical data sample set is of sufficient size, the samples tend to form at least two clusters 210 and 220, as shown in FIG. 2.

Figure 3:
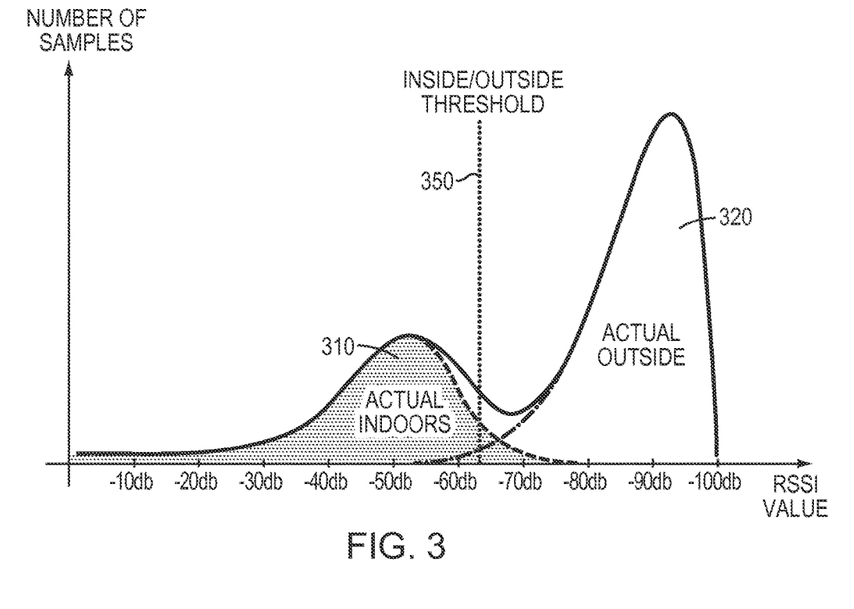
FIG. 3 is a line graph of example RSSI data shown as inside-venue and outside-venue clusters according to an implementation of the invention.

As depicted in FIG. 3, experiments demonstrate that the two clusters 210 and 220 roughly correspond to the RSSI readings for actual inside-venue users 310 and the RSSI readings for outside-venue users 320, representing their statistical groupings on opposite sides of the venue walls. It is then possible to calculate a certain arbitrary threshold value 350 (denoted as an inside/outside threshold in FIG. 3), which can be used to classify specific RSSI readings into "inside" or "outside" for a particular venue with a certain probability.

However, as can be observed on the graph in FIG. 3, there is no clear border value between the two data clusters, as they overlap due to the statistical nature of the process, the exact physical configuration of the venue, and the fact that the actual strength of the signal also depends on parameters other than the distance from a base station. This results in a phenomenon where there is a non-zero probability of finding an actual outside RSSI reading with a value to the left of the arbitrary inside-venue threshold 350 (representing a false positive decision), and finding an actual indoors RSSI reading with a value to the right of the arbitrary inside-venue threshold 350 (representing a false negative decision). Thus, the performance of the system 100 can be described using two metrics: "coverage," calculated as $1/N_{fn}$ (where, $N_{fn}$ is the number of false negatives) and representing how well the system 100 detects the walk-in conditions and minimizes false negatives; and "accuracy," calculated as $1/N_{fp}$ (where, $N_{fp}$ is the number of false positives) and representing the probability of an accurate decision should the system 100 actually declare a walk-in event. Given the overlapping nature of the statistical distribution functions, a purely mathematical approach (e.g., adjusting the placement of the inside-venue threshold 350 between the clusters) is likely not bring ideal results. Instead, as described further, the system 100 is equipped with a set of analytical algorithms that attempt to filter out false positives if they happen to be captured, thereby maximizing coverage without severely affecting accuracy.

Figure 4:
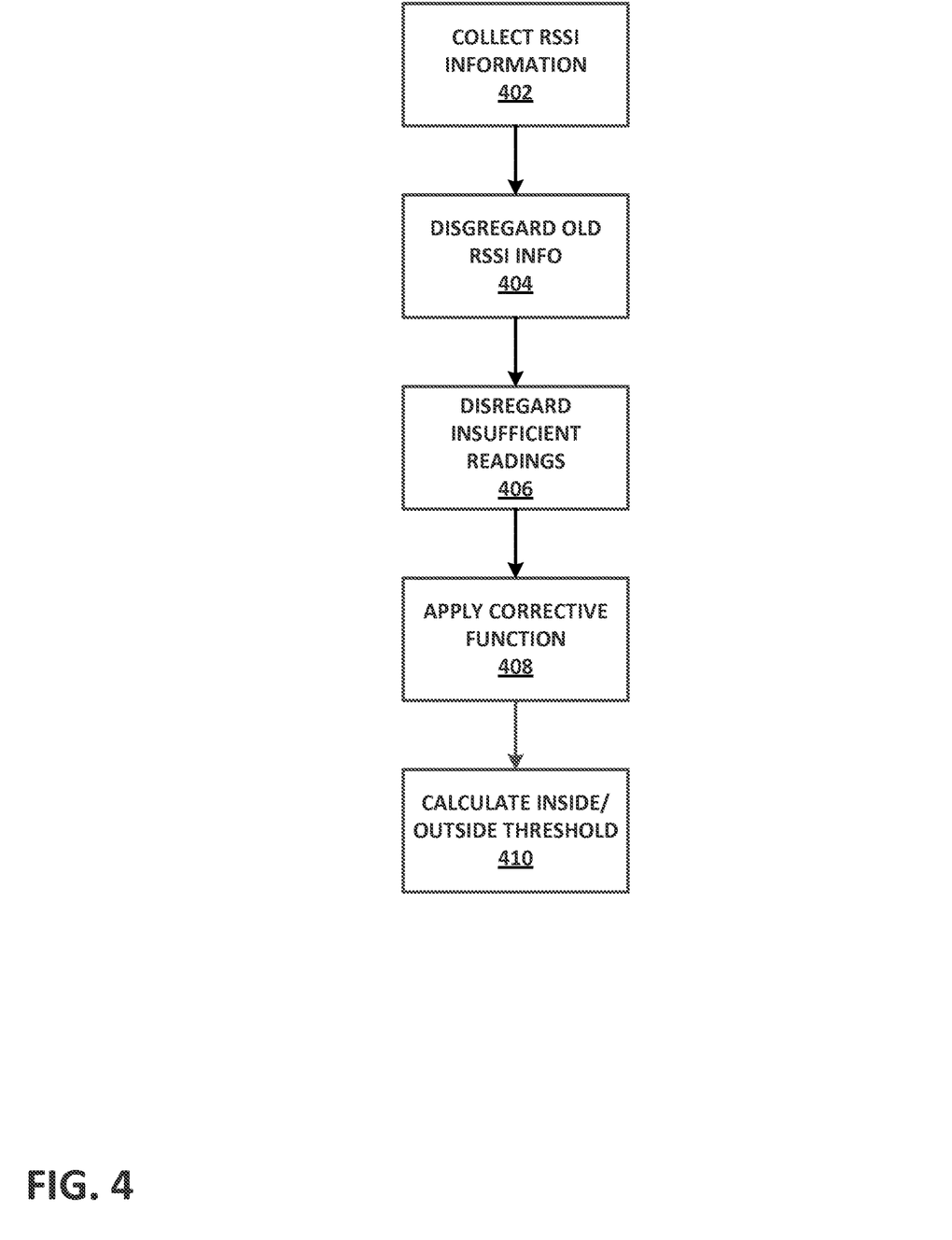
FIG. 4 is a flowchart of an example method for venue walk-in detection according to an implementation of the invention.

Referring now to FIG. 4, before the system 100 can effectively detect venue walk-in events, the system 100 collects a statistical RSSI data set (STEP 402) and performs the following inside-venue threshold selection algorithm. In STEP 404, RSSI readings beyond a certain age (as a non-limiting example, older than one week old) are removed from consideration. This helps to reduce the effects of: (a) historical data not reflecting new physical configurations and radio environments, and (b) the phenomena where, due to the statistical dominance of outside readings, the outside cluster suppresses the significance of the inside cluster (as for most venues, there are generally more people passing the venue outside than entering it).

Optionally, in STEP 406, the collected RSSI data set can be further improved by removing "noise" values, in which, e.g., only a limited number of RSSI readings have been observed for a particular mobile device. As a non-limiting example, the system 100 can eliminate readings for a mobile device for which there are fewer than three readings for a particular base station (or for multiple base stations, cumulatively).

Optionally, in STEP 408, the collected RSSI data set can be further improved by amplifying the inside-venue data cluster and/or de-amplifying the outside-venue data cluster. This can be achieved by applying a corrective multiplying function. In a specific implementation, the function used is $f(x)=((100+x)/50)^3$, where x is a value in the interval of [−100, 0], representing the domain of RSSI values in the original data set.

In STEP 410, the system 100 calculates an arbitrary indoors threshold that is placed substantially between the two clusters (because the clusters overlap, the threshold does not completely separate the two data clusters but, rather, separates substantial portions of the two clusters from each other). In a specific implementation, the threshold is selected using the following approach. First, the RSSI statistical dataset is represented as a table function, as follows.

$$y_i = f(x_i)_{i=0, \ldots, 100}$$

Then, a system of linear algebraic equations is constructed in order to build a polynomial-approximating function using the mean square approximations method, as follows.

$$\sum_{j=0}^{n} a_j \sum_{i=0}^{m} x_i^j x_i^k = \sum_{i=0}^{m} f(x_i) x_i^k$$

The resulting equation system is solved using Gaussian Elimination to find the polynomial coefficients, as follows.

$$P_n(x) = \sum_{j=0}^{n} a_j x^j$$

Then, the inside-venue threshold is selected as the local minimum of the first derivative of the approximating function between the two RSSI data clusters. An optional fail-safe can be further applied, where if the resulting calculated value is larger than a certain pre-defined value $T_{max}$, the threshold is set to $T_{max}$. The above technique is only one example of calculating an arbitrary indoors threshold between two data clusters, and one of ordinary skill in the art will appreciate the various alternative methods that can be used for threshold calculation.

The calculated threshold is then used to assess each individual RSSI reading and classify it as positive (inside venue) or negative (outside venue). The actual walk-in is detected using a more complex algorithm that minimizes false positives by filtering out non-representative one-off positive readings and ensuring that positive readings are seen for a certain period of time. First, positive RSSI readings are grouped into clusters within INSIDE_CLUSTER_TIME. In one specific implementation, INSIDE_CLUSTER_TIME is set to thirty seconds, although other values can be used depending on the implementation. Note that, in some cases, there may be one or more negative readings between two positive ones. Next, if at least three positive clusters have been seen within INSIDE_TIMEFRAME, a walk-in event is detected for the device user. In one specific implementation, INSIDE_TIME_FRAME is set to five minutes, although other values can be used depending on the implementation. Then, as long as at least one positive reading is observed within INSIDE_TIMEFRAME after the last positive reading, those readings are considered to be part of the same walk-in event (e.g., the mobile user is still inside the venue). Upon expiration of the INSIDE_TIMEFRAME limit without any further positive readings, the walk-in event is considered to be completed. The system 100 can notify various servers and applications about the occurrence of the walk-in event, as well as the beginning (i.e., venue walk-in) and end of the event (i.e., venue exit).

In some implementations, other types of data can be used to determine the inside-venue threshold and/or to detect a venue walk-in, instead of or in addition to RSSI information. For example, in situations where the set of collected RSSI readings is insufficient, time-based data may be used to supplement the RSSI readings to determine whether a user has simply passed by a venue or actually entered it. In this instance, two profiles can be built: one for users assumed to be inside the venue, and another for users assumed to be outside the venue. If contact between a base station and a user's mobile device is made (e.g., an RSSI reading or other data transfer) for a certain length of time and/or a threshold number of data readings is achieved over a certain period of time, the user can be assumed as being or more likely to be within the venue, and can be associated with the inside-venue profile. If one or more of the time-based threshold is not achieved, the user can be assumed as not being or less likely to be within the venue, and can be associated with the outside-venue profile.

Certain implementations of the present invention were described above. It is, however, expressly noted that the present invention is not limited to those implementations, but rather the intention is that additions and modifications to what was expressly described herein are also included within the scope of the invention. Moreover, it is to be understood that the features of the various implementations described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A computer-implemented method comprising:
receiving, from a plurality of wireless base stations, received signal strength indication (RSSI) information relating to mobile devices that communicate with the wireless base stations, wherein the RSSI information comprises a cluster of inside-venue data values representing probable inside-venue RSSI readings and a cluster of outside-venue data values representing probable outside-venue RSSI readings;
calculating, for each of the wireless base stations, an inside-venue RSSI threshold comprising a value substantially between the inside-venue data values and the outside-venue data values received from the wireless base station; and
determining whether a venue walk-in event has occurred for a particular mobile device based on a particular inside-venue RSSI threshold and RSSI information relating to the particular mobile device, wherein determining whether a venue walk-in event has occurred comprises:
identifying within a first time window a first cluster of inside-venue RSSI readings for the particular mobile device based on the particular inside-venue RSSI threshold;
identifying within a second time window a second cluster of inside-venue RSSI readings for the particular mobile device based on the particular inside-venue RSSI threshold; and
determining that a venue walk-in event has occurred for the particular mobile device based on a plurality of inside-venue RSSI clusters including the first and second clusters being observed within a third time window encompassing the first and second time windows.

2. The method of claim 1, wherein updated RSSI information is periodically received from the wireless base stations, and wherein the inside-venue RSSI thresholds are periodically recalculated based on the updated RSSI information.

3. The method of claim 1, wherein calculating the inside-venue RSSI threshold comprises disregarding RSSI information older than a certain age.

4. The method of claim 1, wherein calculating the inside-venue RSSI threshold comprises disregarding RSSI information relating to mobile devices for which there are fewer than a threshold number of RSSI readings.

5. The method of claim 1, wherein calculating the inside-venue RSSI threshold comprises applying a corrective function to at least one of the inside-venue cluster and the outside-venue cluster.

6. The method of claim 1, wherein determining whether a venue walk-in event has occurred further comprises filtering out false positive venue walk-in events.

7. The method of claim 1, further comprising notifying an applications server of the venue walk-in event.

8. A system comprising:
one or more computers programmed to perform operations comprising:
receiving, from a plurality of wireless base stations, received signal strength indication (RSSI) information relating to mobile devices that communicate with the wireless base stations, wherein the RSSI information comprises a cluster of inside-venue data values representing probable inside-venue RSSI readings and a cluster of outside-venue data values representing probable outside-venue RSSI readings;
calculating, for each of the wireless base stations, an inside-venue RSSI threshold comprising a value substantially between the inside-venue data values and the outside-venue data values received from the wireless base station; and
determining whether a venue walk-in event has occurred for a particular mobile device based on a particular inside-venue RSSI threshold and RSSI information relating to the particular mobile device, wherein determining whether a venue walk-in event has occurred comprises:
identifying within a first time window a first cluster of inside-venue RSSI readings for the particular mobile device based on the particular inside-venue RSSI threshold;
identifying within a second time window a second cluster of inside-venue RSSI readings for the particular mobile device based on the particular inside-venue RSSI threshold; and
determining that a venue walk-in event has occurred for the particular mobile device based on a plurality of inside-venue RSSI clusters including the first and second clusters being observed within a third time window encompassing the first and second time windows.

9. The system of claim 8, wherein updated RSSI information is periodically received from the wireless base stations, and wherein the inside-venue RSSI thresholds are periodically recalculated based on the updated RSSI information.

10. The system of claim 8, wherein calculating the inside-venue RSSI threshold comprises disregarding RSSI information older than a certain age.

11. The system of claim 8, wherein calculating the inside-venue RSSI threshold comprises disregarding RSSI information relating to mobile devices for which there are fewer than a threshold number of RSSI readings.

12. The system of claim 8, wherein calculating the inside-venue RSSI threshold comprises applying a corrective function to at least one of the inside-venue cluster and the outside-venue cluster.

13. The system of claim 8, wherein determining whether a venue walk-in event has occurred further comprises filtering out false positive venue walk-in events.

14. The system of claim 8, wherein the operations further comprise notifying an applications server of the venue walk-in event.

\* \* \* \* \*